Figures 1, 2:
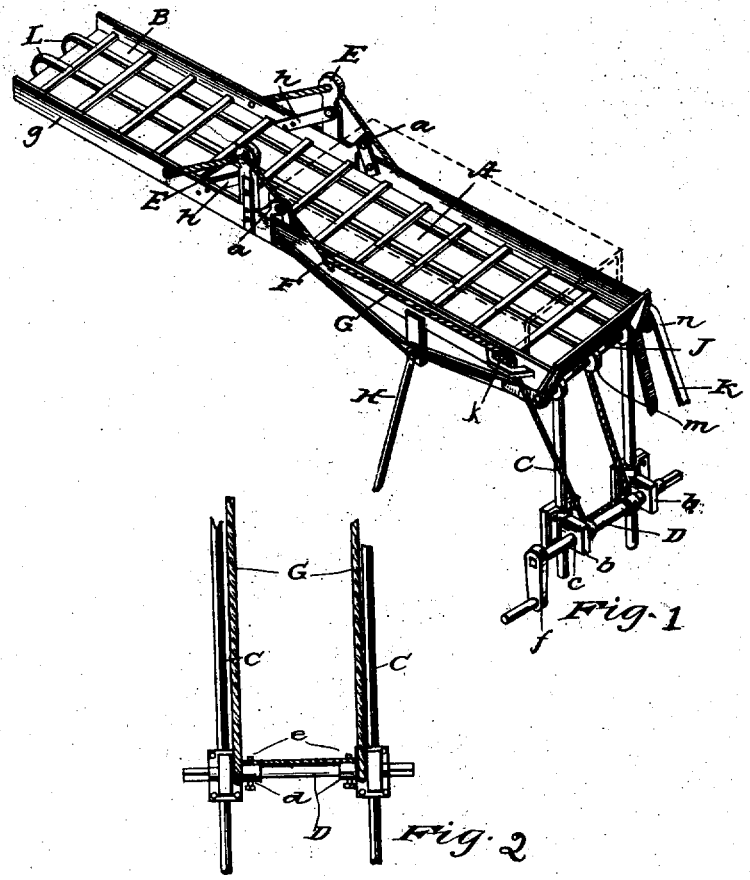

S. G. SCHOLZ.

ATTACHMENT FOR STRAW STACKERS.

No. 11,281. Reissued Nov. 1, 1892.

WITNESSES:-

E. G. Lane

Chas. R. Milly

INVENTOR

Samuel G. Scholz

By M. K. Miller

ATT'Y

UNITED STATES PATENT OFFICE.

SAMUEL G. SCHOLZ, OF BILLINGS, MISSOURI.

ATTACHMENT FOR STRAW-STACKERS.

SPECIFICATION forming part of Reissued Letters Patent No. 11,281, dated November 1, 1892.

Original No. 461,899, dated October 27, 1891. Application for reissue filed May 17, 1892. Serial No. 433,394.

*To all whom it may concern:*

Be it known that I, SAMUEL G. SCHOLZ, a citizen of the United States, and a resident of Billings, county of Christian, State of Missouri, have invented a new and useful Improvement in Straw-Stackers, of which the following is a full, clear, and exact description, reference being had to the accompanying drawings, making part of this specification.

My invention relates to an improvement in straw-stackers; and it consists in providing means by which the operator while standing on the ground may raise the outer end of the rear section to a vertical position and to fold it over and down upon the front section for convenience in transportation, and the same means to be employed to unfold and place the stacker in operative position.

With these ends in view my invention consists of certain features of construction and combination of parts, as will be hereinafter described, and pointed out in the claims.

Figure 1 of the accompanying drawings is a view in perspective of a straw-stacker, illustrating my invention; Fig. 2, a front elevation showing the mechanism for winding up the rope by which the rear portion of the stacker is folded and unfolded.

Similar letters of reference indicate corresponding parts in all of the figures of the drawings.

Referring to Fig. 1, A represents the front section of the carrier, and B the rear section, which parts or sections are hinged together by a hinge *a*, the pintle portion of which projects above the edges of the sides of the stackers to allow the abutting ends of one section of the stacker to free the abutting ends of the other section when power is exerted to swing it upward. The front end portion of section A is supported on or by the vertical supports C, on which are secured brackets provided with journal-boxes *c*, that support the shaft or windlass D, on which is adjustably secured sleeves *d*, having outwardly-projecting lugs or hooks *e*, and on the end of said shaft or windlass is provided a crank *f*, by which the windlass is rotated. At or near the hinged end of the rear section B are provided upwardly-projected arms E, secured to the side board or frame *g*. At the upper end of the arms are provided apertures, as shown, and braces, as *h*, may be provided, that serve to support the arms E.

At the side of section A of the stacker is provided an eye, through which the rope G is passed for the purpose of raising and folding the stacker. This eye may be in the form of a dead-eye or eyebolt, as shown; or, if preferred, may be formed by placing on journal-pins two small sheave-pulleys on the side of the stacker in vertical order and passing the rope through the eye formed by and between the pulleys. The object of the eye is to hold the rope G from vertical movement at the side of the stacker-section A, as shown, for the purpose of arresting the movement of the arm E when the arm has been folded to a position in line with the side of the stacker in the act of folding, as shown in Fig. 3. On the side of the stacker-frame, near the front end of section A, is provided a grooved guide-roller *k*, over which the rope G is placed.

The front end of the stacker-section A is pivotally secured to the top portion of the supports C, about which the section may be rotated, and to raise and secure it in desired adjustment legs or stakes, as H, are provided, the upper ends of which are pivotally secured to the frame of the stacker, the lower end to rest on the carriage.

At the front end of the stacker is provided a cross-shaft J, on which is mounted pulleys *m* and a driving-pulley *n*. Over the latter is placed the driving-band *k*, by which means the straw-carrying belt L is revolved in the usual way. Preferably I use a continuous rope, as G, extending from the upper end of one arm E, through the eye F, over the roller *k*, and down and about the lugs *e* on the sleeves *d*, and up and over the roller *k* on the opposite side of the stacker, through the eye F, and up to the upper end of the arm E on the opposite side. The rope may be tied into the perforation in the arm or passed through and secured to the sides of the frame. By this way of placing the rope in position it may be readily adjusted to either side to equalize the draft on the arms E in raising or holding the outer section in desired adjustment. I secure the arms E to the sides *g* of the stacker on a line at about right angles to a line drawn longitudinally through the sides, in order that when the arms have been drawn or folded to a position parallel with the sides of the front section A and pointing to the eyes F the outer end of section B will have passed a line drawn vertically through the hinges *a*, placing it in position to be lowered and folded down upon the front section A, the arms E passing down.

To fold the stacker, the windlass D is turned by the operator to wind in the rope and to draw the arms E over and down to a point slightly in rear of the eyes F. The rope through the eye will prevent a further movement of the arms and section B of the stacker until the windlass is turned to unwind the rope to lower section B down upon section A. To unfold and place the stacker in operative position, the turning of the windlass is simply reversed to raise or turn the free or outer end of section B of the stacker until it has passed the center and to lower it into position shown in Fig. 1.

Having thus fully described the nature and object of my invention, what I claim as new, and desire to secure by Letters Patent, is—

1. In a stacker, the combination, with two sections hinged together, of a windlass, a rope secured to said windlass, eyes secured to the front section, through which said rope passes, said rope then secured to the rear section of the stacker, and means secured to said rear section for supporting the rope at a point above its attachment with said rear section, whereby said rear section may be folded up, forward, and down upon the front section, substantially as set forth.

2. In a stacker, the combination of two hinged sections, the rear section of which is adapted to fold upwardly and down upon the front section, arms secured to the folding section and projecting upwardly therefrom at approximately right angles, guide-eyes secured to the front section near its rear end, guide-rollers secured near its forward end, a windlass, and a rope leading from said windlass over said rollers through said guide-eyes and the arms and secured to said rear section, substantially as set forth.

3. A stacker comprising the sections A and B, the hinge *a*, arms E, eyes F, rope G, and windlass D, arranged and operated substantially as set forth.

4. A stacker comprising the sections A and B, a hinge by which said sections are secured in hinged relation, arms E, secured to the rear section, eyes F, guide-rollers *k*, rope G, supports C, and windlass D, having lugs or pins *e* projecting therefrom, substantially as described, and for the purpose set forth.

In testimony whereof I have hereunto set my hand this 19th day of February, A. D. 1892.

SAMUEL G. SCHOLZ.

Witnesses:
J. W. TURNER,
J. R. TURNER.